United States Patent [19]
Yamada

[11] Patent Number: 5,343,477
[45] Date of Patent: Aug. 30, 1994

[54] DATA PROCESSING SYSTEM WITH DATA TRANSMISSION FAILURE RECOVERY MEASURES

[75] Inventor: Kazutoshi Yamada, Shiga, Japan
[73] Assignee: Omron Corporation, Kyoto, Japan
[21] Appl. No.: 758,108
[22] Filed: Sep. 12, 1991
[30] Foreign Application Priority Data
 Sep. 17, 1990 [JP] Japan ................. 2-248172
[51] Int. Cl.$^5$ ........................... G06F 11/00
[52] U.S. Cl. ................... 371/8.2; 371/11.2; 395/575
[58] Field of Search ........... 371/8.2, 11.2, 11.3, 371/7, 8.1, 9.1, 10.1, 11.1; 395/575; 364/269.2

[56] References Cited
U.S. PATENT DOCUMENTS

| | | | |
|---|---|---|---|
| 4,430,727 | 2/1984 | Moore et al. | 364/900 |
| 4,577,272 | 3/1986 | Ballew et al. | 364/200 |
| 4,608,688 | 8/1986 | Hansen et al. | 371/11 |
| 4,634,110 | 1/1987 | Julich et al. | 371/11 |
| 5,060,185 | 10/1991 | Naito et al. | 364/900 |

Primary Examiner—Robert W. Beausoliel, Jr.
Assistant Examiner—Stephen C. Elmore
Attorney, Agent, or Firm—Foley & Lardner

[57] ABSTRACT

A data processing system with data transmission failure recovery measures includes a plurality of first POS terminals and a plurality of second POS terminals. Each POS terminal is connected to two transmission lines. A first file server is connected to one of the transmission lines. A second file server having stored contents identical to that of the first file server is connected to the other transmission line. The first POS terminal accesses the first file server, and the second POS terminal accesses the second file server during normal transmission. This permits incorporation of a plurality of files and allows a large number of POS terminals to be installed while alleviating access concentration of the files. Because the transmission lines and files are multiplexed, data processing including data transmission can be continued, thereby avoiding a system down, by switching from the normal transmission line or file when a transmission failure occurs. The two file servers are connected to each other via another transmission line to update the stored content of one file via the third transmission line to conform to the update of the stored contents of the other file. Thus, after updating, the stored contents of those files are always identical and the same data can always be obtained regardless of which file is accessed.

5 Claims, 4 Drawing Sheets

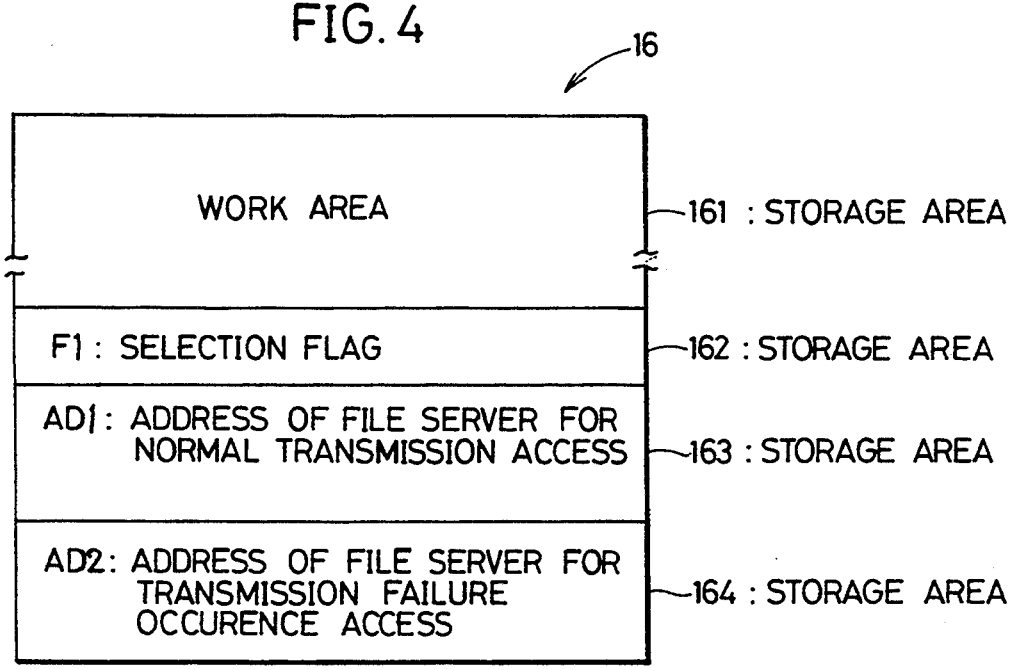
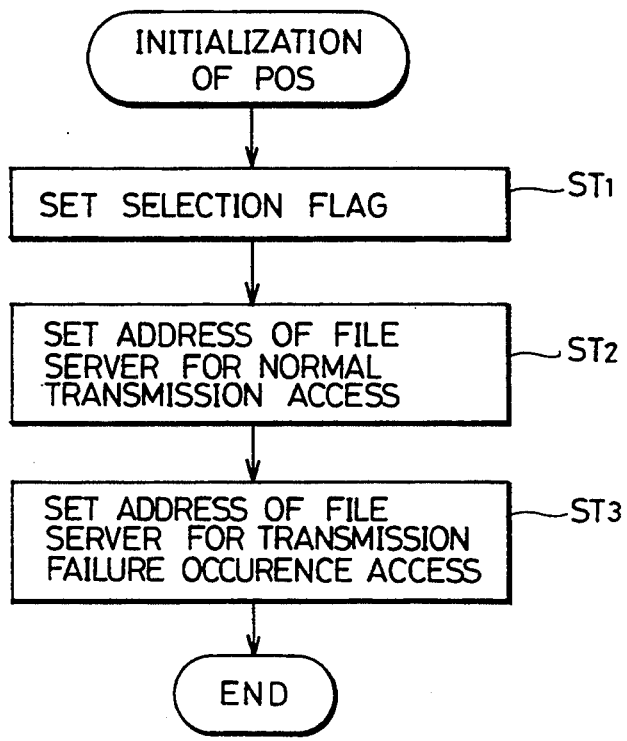

DATA PROCESSING SYSTEM WITH DATA TRANSMISSION FAILURE RECOVERY MEASURES

BACKGROUND OF THE INVENTION

1. Field of the Invention

The present invention relates to data processing systems, and more particularly, to a data processing system with data transmission failure recovery measures wherein a system down is prevented in order to allow continuation of data transmission when there is failure during data transmission.

2. Description of the Background Art

FIG. 7 shows a conventional POS (Point of Sales) system with data transmission failure recovery measures. Referring to FIG. 7, a POS system 50 includes a plurality of POS terminals 51, a file server 52, a backup file server 53, and a host computer 55. Each POS terminal 51 is used for registering sales data into the system. File server 52 stores commodity name data, price data for each commodity code (price look up code: PLU code) corresponding to a bar code, as well as data indicating the amount of purchased commodities (commodity proceeds) data and numbers of purchased commodities (purchased commodity quantity) data in a file. Backup file server 53 is used as a backup in case of failure in file server 52. File server 52 and backup file server 53 are connected via a transmission line 54 for transmitting data between each other, so that the stored contents in file server 52 is always identical to that in backup file server 53. Host computer 55 accumulates and monitors sales data provided from each of POS terminals 51. POS terminals 51, file server 52, backup file server 53 and host computer 55 are connected to each other via transmission lines 56 and 57.

Transmission line 56 is used for normal transmission, whereas transmission line 57 is used when there is failure in transmission line 56.

In the case of registering sales data into the system, POS terminal 51 accesses file server 52 via transmission line 56 under normal transmission. Data such as price data corresponding to the PLU code requested from POS terminal 51 is read out from file server 52 to be provided to that POS terminal 51 via transmission line 56. File server 52 has commodity proceeds data and purchased commodity quantity data corresponding to the requested PLU code updated. The updated data are provided to backup file server 53 via transmission line 54, whereby the stored contents in backup file server 53 is updated according to the updated data, so that the stored contents of both file servers are always identical to each other after completion of the update.

In cases where failure occurs in transmission line 56 such that transmission cannot be carried out, each of POS terminals 51, file server 52, and host computer 55 automatically switch from transmission line 56 to transmission line 57 to continue transmission.

In cases where failure occurs in file server 52, each of POS terminals 51 and host computer 55 automatically access backup file server 53. The POS system of FIG. 7 includes dual transmission lines and file servers so that data transmission can be continued even if there is failure in the transmission lines or the file servers, avoiding a system down.

Although the above described conventional POS system has dual transmission lines and file servers for avoiding system down due to transmission failure, only one of the two transmission lines and the two file servers are used during normal transmission. The other transmission line and file server are not used as long as failure does not occur during data transmission.

Because the number of POS terminals installed in a POS system has recently been increasing, access to a file server is likely to be frequent and concentrated. This causes the a problem that the data processing speed of the POS terminals and the POS system is reduced. As a result it is desirable to use the backup file server at the time of normal transmission.

SUMMARY OF THE INVENTION

An object of the present invention is to provide a data processing system with data transmission failure recovery measures that can improve speed of data processing.

Another object of the present invention is to provide a data processing system with data transmission failure recovery measures that can have a large number of terminals connected while avoiding a system down in case of transmission failure.

Briefly stated, the present invention is a data processing system including first and second storage each storing identical file contents, a first transmission line connected to the first storage, a second transmission line connected to the second storage, a plurality of first terminals connected to the first and second transmission lines, and a plurality of second terminals connected to the first and second transmission lines.

The first terminal includes a first transmission control portion for data transmission between the first terminal and the first storage via the first transmission line, a second transmission control portion for data transmission between the first terminal and the second storage via the second transmission line, and a first switching portion for selecting the first transmission control portion when normal transmission is carried out, and for selecting the second transmission control portion when a failure has occurred in transmission with the first transmission control portion. The second terminal includes a first transmission control portion for data transmission between the second terminal and the first storage via the first transmission line, a second transmission control portion for data transmission between the second terminal and the second storage via the second transmission line, and a second switching portion for selecting the second transmission control portion when normal transmission is carried out, and for selecting the first transmission control portion when the failure has occurred in transmission with the second transmission control portion.

A data processing system according to another aspect of the present invention includes a third transmission line for connecting the first storage to the second storage. Each of the first and second storage includes a third transmission control portion for transferring the updated contents of one storage to the other storage via the third transmission line when a stored content is updated, and an updating portion for updating the stored content according to the transferred contents by the third transmission control portion.

According to the present invention, the terminals are in advance classified into those that access the first storage and those access the second storage, whereby a plurality of files are used individually and simultaneously at normal transmission. Therefore, access to a file is not delayed for the large number of terminals.

Because the transmission lines are multiplexed and a plurality of files are respectively stored in individual storage, transmission process can be continued, thereby avoiding system down when transmission failure occurs.

Because files are connected to each other through a transmission line so that an updated stored content of one file is promptly provided to update the other file, the stored contents of both file servers are always identical to each other following the update. Therefore, each terminal can obtain the same data regardless of which file is accessed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing the storage area of the memory of FIG. 2.

FIG. 5 is a flow chart for explaining the initialization operation of the POS terminal of FIG. 1.

DESCRIPTION OF THE PREFERRED EMBODIMENTS

A POS system as a data processing system will be explained hereinafter. It will be appreciated that the present invention is not limited to the described embodiment, and is applicable to any system carrying out data transmission.

Figure 1:
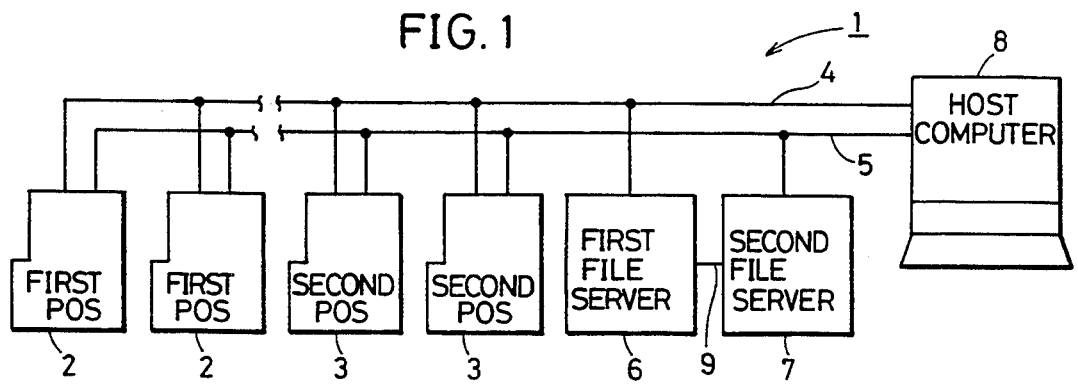
FIG. 1 shows a structure of a POS system according to an embodiment of the present invention.

FIG. 1 shows a structure of a POS system according to an embodiment of the present invention. Referring to FIG. 1, a POS system 1 comprises POS terminals 2 and 3, transmission lines 4 and 5, file servers 6 and 7, and a host computer 8.

The plurality of POS terminals are classified into first POS terminals 2 and second POS terminals 3 in the present embodiment. Each of first POS terminals 2 is set to access first file server 6 via transmission line 4 during normal transmission. Each of second POS terminals 3 is set to access second file server 7 via transmission line 5 during normal transmission. Because two file servers are used in parallel during normal transmission in the POS system, large number of POS terminals can be installed in the invention as compared with a conventional system while maintaining the processing speed of the POS system and each POS terminal.

First POS terminals 2 and second POS terminals 3 are both connected to transmission lines 4 and 5. First POS terminals 2 can access second file server 7 via transmission line 5, and second POS terminals 3 can access first file server 6 via transmission line 4, by modifying the data, as described in detail herein. When hardware or software failure occurs in transmission line 4 or 5, or in file server 6 or 7, thereby disabling normal transmission (a condition referred to as transmission failure hereinafter), the normal file server can be accessed by modifying the data set at the time of normal transmission. In other words, when transmission failure occurs in transmission line 4 or first file server 6, first POS terminals 2 and second POS terminals 3 can both access second file server 7 via transmission line 5 to carry out normal transmission. If transmission failure occurs in transmission line 5 or in second file server 7, first POS terminals 2 and second POS terminals 3 can access first file server 6 via transmission line 4. Thus, when transmission failure as defined herein occurs, all POS terminals access one file server via a single transmission line. Although this reduces the processing speed of the entire POS system, this effect is encountered only at the time of transmission failure, and will not be a practical problem.

First file server 6 and second file server 7 are connected to each other via a transmission line 9, whereby data is transmitted between the two file servers via transmission line 9 to update stored contents. Therefore, the stored contents of both file servers are always identical to each other following the update, so that file server 6 can be used as a backup for file server 7, whereas file server 7 can be as a backup for file server 6.

Host computer 8 can access first file server 6 via transmission line 4 and can access second file server 7 via transmission line 5 during normal transmission. Because the stored contents of first file server 6 and second file server 7 are always promptly updated to be identical to each other as described above, host computer 8 can obtain the same result data regardless of which file server is accessed. Host computer 8 can detect the idle state of transmission path 4 or 5 by communicating with a connected POS terminal under a polling/selecting method. In response to the detected result, host computer 8 can carry out data transmission with a file server via the transmission line that is not carrying out data transmission between the POS terminal and the file server. This improves the usage efficiency of the transmission line.

Figure 2:
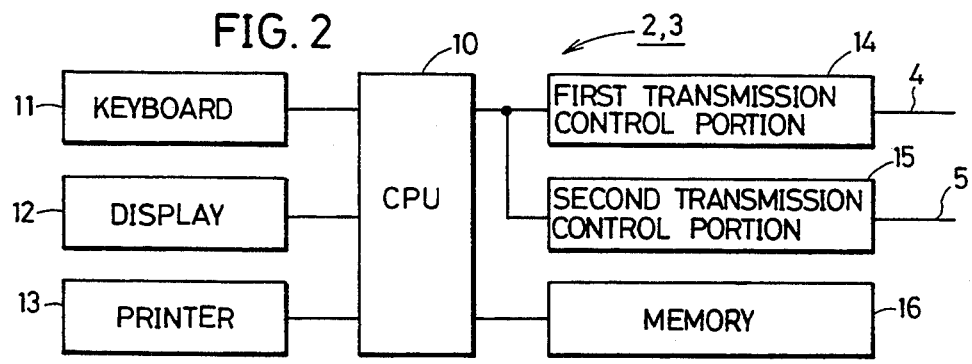
FIG. 2 is a block diagram schematically showing the electrical structure of first and second POS terminals of FIG. 1.

FIG. 2 is a block diagram schematically showing the electrical structure of first and second POS terminals of FIG. 1. Referring to FIG. 2, each of POS terminals 2 and 3 includes a CPU 10 for operation processing and operation control. A keyboard 11, a display 12, a printer 13, a first transmission control portion 14 connected to transmission line 4, a second transmission control portion 15 connected to transmission line 5, and a memory 16 are connected to CPU 10. Keyboard 11 is for entering data associated with the transaction. Display 12 displays data entered from keyboard 11. Printer 13 prints this data. First transmission control portion 14 is for data transmission via transmission line 4. Second transmission portion 15 is for data transmission via transmission line 5.

First POS terminals 2 are set in advance to provide for transmitting data by first transmission control portion 14 during normal transmission. When transmission failure occurs during the operation of the POS system such that data cannot be transferred via first transmission control portion 14, first POS terminal 2 is set to allow switching to second transmission control portion 15 to continue data transmission.

Second POS terminal 3 is set in advance to provide for transmitting data by second transmission control portion 15 during normal transmission. When transmission failure occurs during the operation of the POS system that data cannot be transferred by second transmission control portion 15, second POS terminal 3 is set to allow switching to first transmission control portion 14 to continue data transmission.

Figure 6:
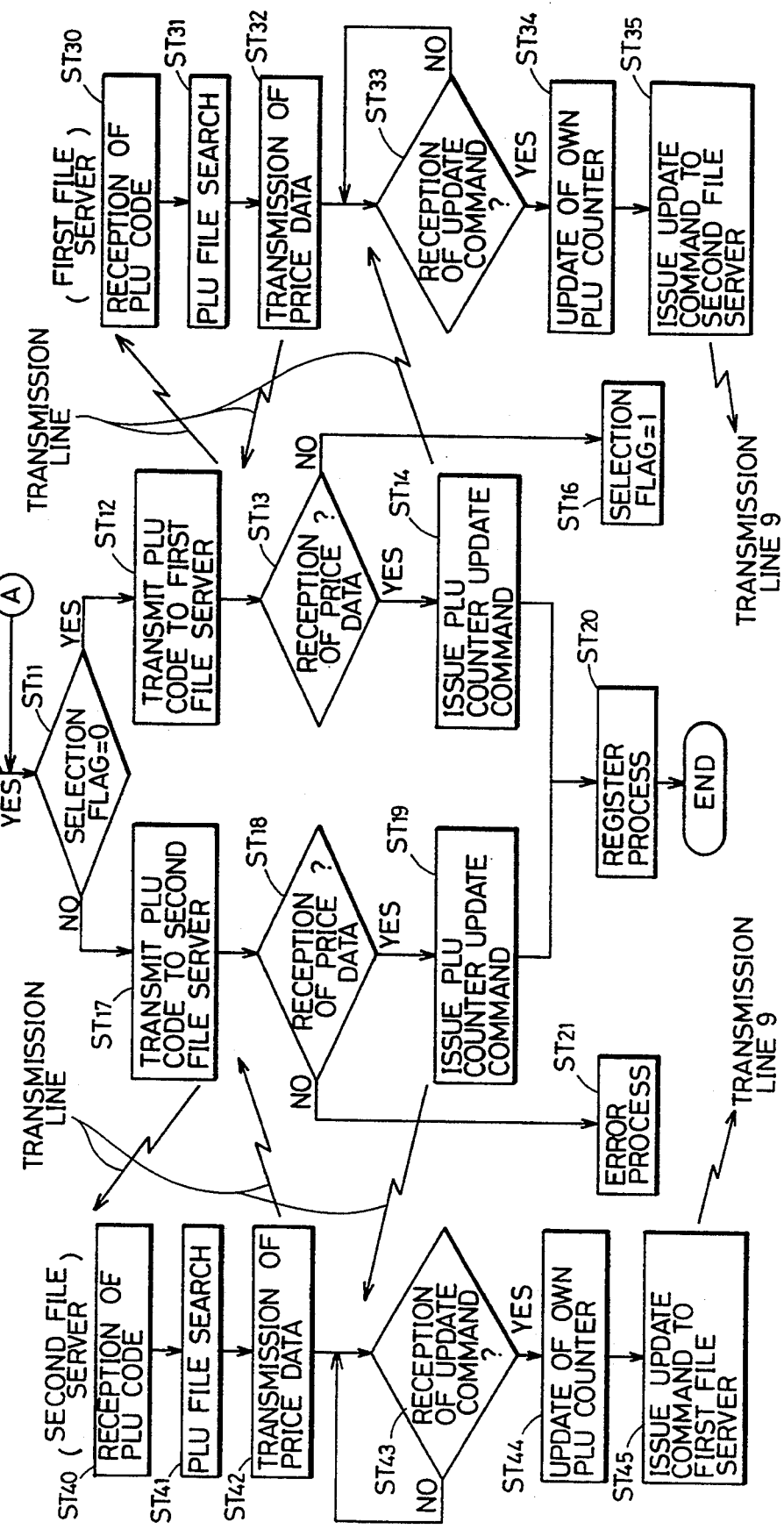
FIG. 6 is a flow chart for explaining the operation of an embodiment of the present invention.
Figure 7:
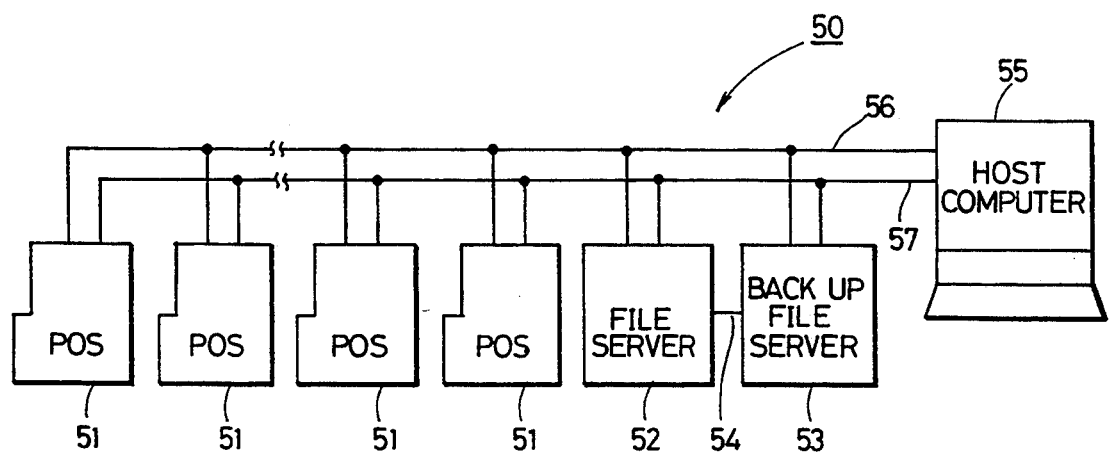
FIG. 7 is a diagram showing a structure of a conventional POS system with data transmission failure prevention measures.

Memory 16 comprises a ROM (Read Only Memory) for storing in advance the operation program of CPU 10 such as those shown in the flow charts of FIGS. 5 and 6, and a RAM (Random Access Memory) having a storage area as shown in FIG. 4.

Figure 3:
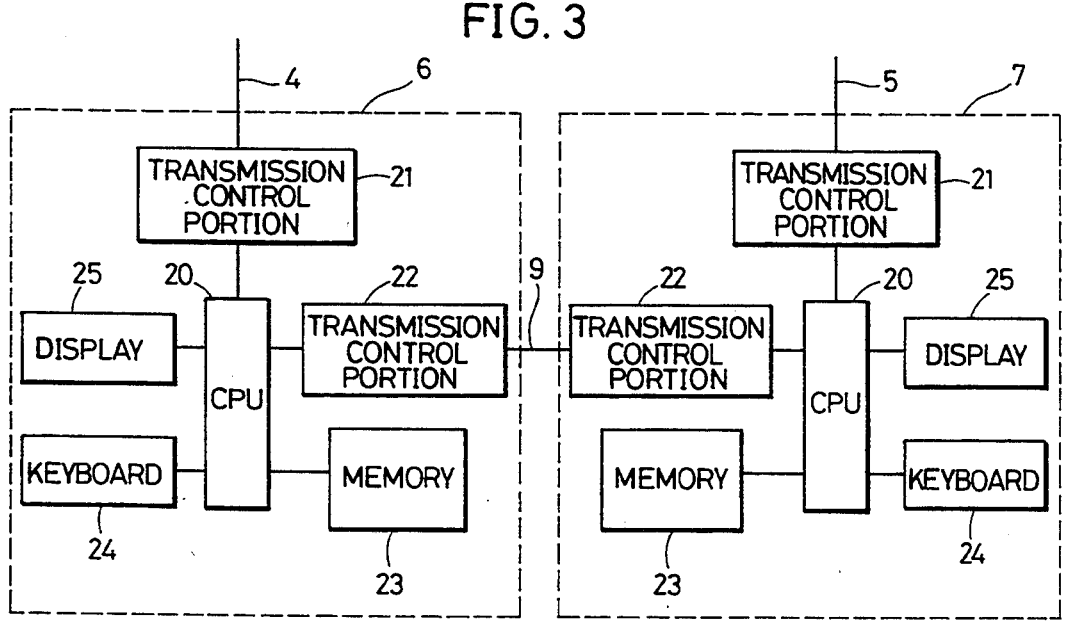
FIG. 3 is a block diagram schematically showing the electrical structure of first and second file servers of FIG. 1.

FIG. 3 is a block diagram schematically showing the electrical structure of first and second file servers of FIG. 1. Referring to FIG. 3, first file server 6 and second file server 7 have corresponding components denoted with identical reference numbers since they have identical structures. Each file server has a CPU 20 for controlling the operation. Transmission control portions 21 and 22, a memory 23, a keyboard 24, and a display 25 are connected to CPU 20.

Transmission control portion 21 carries out data transmission via a connected transmission line. Transmission control portion 21 of first file server 6 is connected to transmission line 4. Transmission control portion 21 of second file server 7 is connected to transmission line 5. Transmission control portion 22 is connected to transmission line 9 for carrying out data transmission between the file servers. Memory 23 stores a plurality of PLU codes, as well as commodity name data, price data, commodity proceeds data, purchased commodity quantity data and the like corresponding to a PLU code as a file. A file storing data associated with the transaction of each PLU code is called a PLU file. A memory region storing commodity proceeds data, purchased commodity quantity data and the like in accumulation is called a PLU counter.

FIG. 4 is a diagram of the storage area of the memory of the POS terminal of FIG. 2. Referring to FIG. 4, memory 16 comprises storage areas 161-164. Storage area 161 is a work area where data entered from keyboard 11 of the POS terminal and data read out from a file server are temporarily stored. Storage area 162 stores a selection flag F1 indicating which, the file servers of first file server 6 and second file server 7, is to be currently accessed by the POS terminal. The stored selection flag F1 is reset (0) for selecting first file server 6 in first POS terminal 2, and set (1) for selecting second file server 7 in second POS terminal 3 at the time of transmission. Storage area 163 stores in advance an address AD1 of the file server to be accessed at the time of normal transmission. Storage area 164 stores in advance an address AD2 of the file server to be accessed at the time of transmission failure occurrence. Accordingly, first POS terminal 2 has in advance the address of first file server 6 stored in area 163, and the address of second file server 7 in area 164. Second POS terminal 3 has in advance the address of second file server 7 stored in area 163, and the address of first file server 6 in area 162.

FIG. 5 is a flow chart for explaining the initialization operation of the POS terminal of FIG. 1. This flow is stored in advance in storage area 161 in memory 16 of each POS terminal as a program. To carry out initialization in each POS terminal, the mode selecting switch (not shown) provided in keyboard 11 is switched to the initialization mode. At initialization mode, 0 or 1 are entered from keyboard 11 in order to set or reset selection flag F1. In response, CPU 11 resets (0) or sets (1) selection flag F1 to store the same in area 162 of memory 16 (ST1 in FIG. 5). Next, address AD1 or AD2 of first file server 6 or second file server 7 is stored in area 163 for setting the file server to be accessed at the time of normal transmission (ST2 in FIG. 5). Then, address AD2 or AD1 of second file server 7 or first file server 6 is stored in area 164 for setting the file server to be accessed in the case of transmission failure.

FIG. 6 is a flow chart explaining the operation of an embodiment of the present invention. The operation of the embodiment of the present invention will be explained in detail with reference to FIGS. 1–6.

Because the operations of the first POS terminal 2 and the second POS terminal 3 in FIG. 1 are similar to each other, the operation using first POS terminal 2 of FIG. 1 will be explained as an example. In the case where second POS terminal 3 is used, the file server to be accessed at normal transmission and the file server to be accessed at the time of transmission failure occurrence are opposite those of the first POS terminal 2. The other operations are identical, so that descriptions regarding second POS terminal 3 will not be repeated.

In first POS terminal 2, an entry of PLU code from keyboard 11 (ST10 in FIG. 6) causes selection flag F1 stored in area 162 of memory 16 to be checked (ST11 of FIG. 6). If selection flag F1 is reset (0), the PLU code is transmitted to first file server 6. If selection flag F1 is set (1), the PLU code is transmitted to second file server 7. Since selection flag F1 is reset (0) in POS terminal 2, the entered PLU code is transmitted to first file server 6 via transmission line 4 (ST12 in FIG. 6).

Upon receiving the PLU code, first file server 6 searches the PLU file stored in advance in memory 23 to read out the price data corresponding to the received PLU code. The read out data is transmitted to the POS terminal 2 via transmission line 4 (ST30-ST32 in FIG. 6).

Upon receiving the price data from first file server 6, first POS terminal 2 transmits a command to first file server 6 via transmission line 4 indicating update of commodity proceeds data and purchased commodity quantity data of the PLU counter in memory 23 (ST13, ST14 of FIG. 6). Sales data is printed on a receipt and a journal by printer 13 for registration (ST20 of FIG. 6).

Upon receiving the update command of the PLU counter via a transmission line 4 from POS terminal 2, first file server 6 updates its own PLU counter (ST33, ST34 of FIG. 6). Then a command indicating that the PLU counter of second file server 7 should be updated is transmitted to second file server 7 via transmission line 9 (ST35 of FIG. 6). In response to the reception of this update command, second file server 7 updates its PLU counter according to the reception command.

If POS terminal 2 cannot receive the price data from first file server 6 within a predetermined time period after the PLU code is transmitted, CPU 11 makes a decision that a transmission failure has occurred in transmission line 4 or first file server 6 in order to switch selection flag F1 to the set state of "1" (ST16 of FIG. 6).

The control returns to step ST10 of PLU code transmission. Since selection flag F1 is set (1) due to the transmission failure occurrence, the next entered PLU code is transmitted to second file server 7 via transmission line 5 (ST17 in FIG. 6).

Upon receiving the PLU code via transmission line 5, second file server 7 searches its own PLU file to read out and transmit the price data corresponding to the received PLU code to the first POS terminal 2 via transmission line (ST40-ST42 of FIG. 6)

Upon receiving price data via transmission line 5, first POS terminal 2 transmits a command indicating update of the PLU counter to second file server 7 via transmission line 5 (ST18, ST19 of FIG. 6). Then, the sales data is printed on a receipt and a journal by printer 13 for registration (ST20 of FIG. 6).

Upon receiving an update command via transmission line 5, second file server 7 updates its own PLU counter according to the received update command (ST43, ST44 of FIG. 6). Then, a command indicating that the PLU counter of first file server 6 should be updated is transmitted to first file server 6 via transmission line 9 (ST45 of FIG. 6). If there is transmission failure in transmission line 9 or first file server 6, second file server 7 resends this command when recovering from transmission failure.

If the first POS terminal 2 cannot receive the price data from second file server 7 within a predetermined time period, CPU 11 makes a decision that there is a transmission failure also in transmission line 5 or second file server 7 in order to carry out an error recovery process and await recovery.

Hence, each of the POS terminals in the POS system accesses either of file server 6 or file server 7 at the time of data processing in order to alleviate access concentration of each file server and to improve the data processing speed of the system itself and of each terminal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing system with data transmission failure recovery measures, comprising:
   first and second storing means for storing files having identical contents,
   a first transmission line connected to said first storing means,
   a second transmission line connected to said second storing means,
   a plurality of first terminals connected to said first and second transmission lines, and
   a plurality of second terminals connected to said first and second transmission lines;
   wherein each of said first and second terminals comprises:
   first transmission control means for transmitting data to and from said first storing means only via said first transmission line, and
   second transmission control means for transmitting data to and from said second storing means via only said second transmission line,
   wherein each of said first terminals further comprises first switching means for selecting said first transmission control means during normal transmission, and for selecting said second transmission control means if a failure in a transmission controlled by said first transmission control means occurs and,
   wherein each of said second terminals further comprises second switching means for selecting said second transmission control means during normal transmission, and for selecting said first transmission control means if a failure in a transmission controlled by said second transmission control means occurs,
   such that said first and second terminals communicate over different transmission lines during normal transmission and over a same transmission line if a failure in transmission over one of said first and second transmission lines occurs.

2. The data processing system with data transmission failure recovery measures according to claim 1, wherein
   each of said first and second terminals further comprises storing means for storing specific data for specifying either of said normal transmission or said failure in a transmission as well as enabling data for enabling one of said transmission control means and said second transmission control means, and
   wherein each of said first and second switching means is responsive to said specific data stored in said storing means for selecting one of said first and second transmission control means to enable said one transmission control means according to said enabling data.

3. The data processing system with data transmission failure recovery measures according to claim 2, wherein each of said first and second terminals further comprises:
   failure detecting means for detecting occurrence of said transmission failure, and
   specific data updating means responsive to detection of an occurrence of said failure in a transmission by said failure detecting means for updating said specific data stored in said storing means.

4. The data processing system with data transmission failure recovery measures according to claim 1, further comprising a third transmission line for connecting said first storing means to said second storing means,
   wherein each of said first and second storing means comprises
   third transmission control means for transmitting updated contents of one storing means to the other storing means via said third transmission line when stored content is updated, and
   updating means for updating stored contents according to the transmitted contents by said third transmission control means.

5. The data processing system with data transmission failure recovery measures according to claim 4, wherein
   said first storing means further comprises first updating means for updating stored content according to a first predetermined data provided from said first transmission control means, and
   said second storing means further comprises second updating means for updating stored content according to a second predetermined data provided from said second transmission control means.

\* \* \* \* \*